US010328365B2

(12) United States Patent
Amaravadi et al.

(10) Patent No.: US 10,328,365 B2
(45) Date of Patent: Jun. 25, 2019

(54) TRANSVERSE FLOW SELF-CLEANING STRAINER

(71) Applicant: M-I L.L.C., Houston, TX (US)

(72) Inventors: Venkata Amaravadi, Tomball, TX (US); Richard Bingham, Katy, TX (US)

(73) Assignee: M-I L.L.C., Houston, TX (US)

( * ) Notice: Subject to any disclaimer, the term of this patent is extended or adjusted under 35 U.S.C. 154(b) by 331 days.

(21) Appl. No.: 15/243,284

(22) Filed: Aug. 22, 2016

(65) Prior Publication Data

US 2017/0050128 A1 Feb. 23, 2017

Related U.S. Application Data

(60) Provisional application No. 62/208,571, filed on Aug. 21, 2015.

(51) Int. Cl.
| | |
|---|---|
| *B01D 29/11* | (2006.01) |
| *B01D 29/60* | (2006.01) |
| *B01D 29/66* | (2006.01) |
| *B01D 29/92* | (2006.01) |
| *B01D 37/04* | (2006.01) |

(52) U.S. Cl.
CPC ........... *B01D 29/66* (2013.01); *B01D 29/117* (2013.01); *B01D 29/603* (2013.01); *B01D 29/606* (2013.01); *B01D 29/925* (2013.01); *B01D 37/04* (2013.01)

(58) Field of Classification Search
CPC .... B01D 29/66; B01D 29/117; B01D 29/603; B01D 29/606; B01D 37/04
See application file for complete search history.

(56) References Cited

U.S. PATENT DOCUMENTS

| | | | |
|---|---|---|---|
| 6,475,071 B1 * | 11/2002 | Joslyn | B01D 33/11 210/190 |
| 2005/0109684 A1 * | 5/2005 | DiBella | B01D 29/15 210/96.1 |
| 2012/0074069 A1 * | 3/2012 | Ripley | B01D 35/1435 210/741 |

* cited by examiner

*Primary Examiner* — James C Goloboy
(74) *Attorney, Agent, or Firm* — David J. Smith; Jeff Frantz

(57) ABSTRACT

A system for filtering particles from a fluid includes a strainer. The strainer includes a housing having an inlet, a first outlet, a second outlet. A filter element is positioned in an internal volume of the housing. The filter element defines a bore formed axially-therethrough and openings that are substantially transverse to the bore. A first portion of the fluid that enters the housing through the inlet flows through the openings in the filter element and exits the housing through the first outlet, and a second portion of the fluid that the housing through the inlet bypasses the openings and exits the housing through the second outlet.

20 Claims, 4 Drawing Sheets

TRANSVERSE FLOW SELF-CLEANING STRAINER

This application claims benefit to U.S. Provisional Patent Application No. 62/208,571, filed on Aug. 21, 2015, the entirety of which is incorporated herein by reference.

FIELD

Background Information

A conventional strainer uses a "dead-end" filtration method to filter solid particles from a stream of fluid. In the dead-end filtration method, the fluid that is to be filtered flows through a filtering element such as a hollow, cylindrical basket that has a plurality of radial openings. As the fluid flows through the openings, at least a portion of the particles (e.g., those particles having a diameter greater than the diameter of the openings) are separated from the fluid and remain inside the basket. This particle residue, also known as "filtrate," tends to build up on the inner walls of the basket, eventually forming a "filter cake" on the inner surface of the basket. The filtrate reaches a point where fluid flow through the openings and out of the strainer is reduced or altogether prevented. As a result, the strainer may be shut down periodically to remove the filtrate.

To prevent such periodic shut downs, some strainers include a plunger that moves axially within the strainer to scrape the filtrate from the inner surface of the basket. Other strainers may use a backflush technique that temporarily reverses the flow direction through the openings in the basket to remove the filtrate from the inner surface of the basket. These and other techniques for removing the filtrate from the strainer include moving parts, an external power source to supply power to the moving parts, and a dedicated drain line for the filtrate.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system for filtering particles from a fluid is disclosed. The system includes a strainer. The strainer includes a housing having an inlet, a first outlet, a second outlet. A filter element is positioned in an internal volume of the housing. The filter element defines a bore formed axially-therethrough and openings that are substantially transverse to the bore. A first portion of the fluid that enters the housing through the inlet flows through the openings in the filter element and exits the housing through the first outlet, and a second portion of the fluid that the housing through the inlet bypasses the openings and exits the housing through the second outlet.

In another embodiment, the system includes a main line having the fluid flowing therethrough. A pump is coupled to the main line. The pump causes a portion of the fluid from the main line to flow therethrough, and the portion includes from about 1% to about 10% of the fluid in the main line. A strainer is coupled to the pump. The strainer includes a housing having an inlet, a first outlet, a second outlet. A filter element is positioned in an internal volume of the housing. The filter element defines a bore formed axially-therethrough and openings that are substantially transverse to the bore. A first portion of the fluid that enters the housing through the inlet flows through the openings in the filter element and exits the housing through the first outlet, and a second portion of the fluid that the housing through the inlet flows through the bore and exits the housing through the second outlet. A sensor is coupled to the first outlet and measures a flow rate of the first portion of the fluid that exits the housing through the first outlet. A valve is coupled to the first outlet and actuates to maintain the flow rate of the first portion of the fluid within a predetermined range.

A method for filtering particles from a fluid is also disclosed. The method includes introducing a fluid into a strainer through an inlet of the strainer. The strainer includes a housing having the inlet, a first outlet, a second outlet. A filter element is positioned in an internal volume of the housing. The filter element defines a bore formed axially-therethrough and openings that are substantially transverse to the bore. A first portion of the fluid that enters the housing through the inlet flows through the openings in the filter element and exits the housing through the first outlet, and a second portion of the fluid that the housing through the inlet flows through the bore and exits the housing through the second outlet. A flow rate of the fluid entering the housing through the inlet is measured with a first sensor that is coupled to the inlet. A flow rate of the first portion of the fluid that exits the housing through the first outlet is measured with a second sensor that is coupled to the first outlet. The flow rate of the fluid entering the housing through the inlet is compared against the flow rate of the first portion of the fluid that exits the housing through the first outlet. A valve coupled to the first outlet is actuated when the flow rate of the first portion of the fluid that exits the housing through the first outlet differs from the flow rate of the fluid that enters the housing through the inlet by more than a predetermined amount.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings are illustrative embodiments, and are, therefore, not to be considered limiting of its scope.

DETAILED DESCRIPTION

Figure 1:
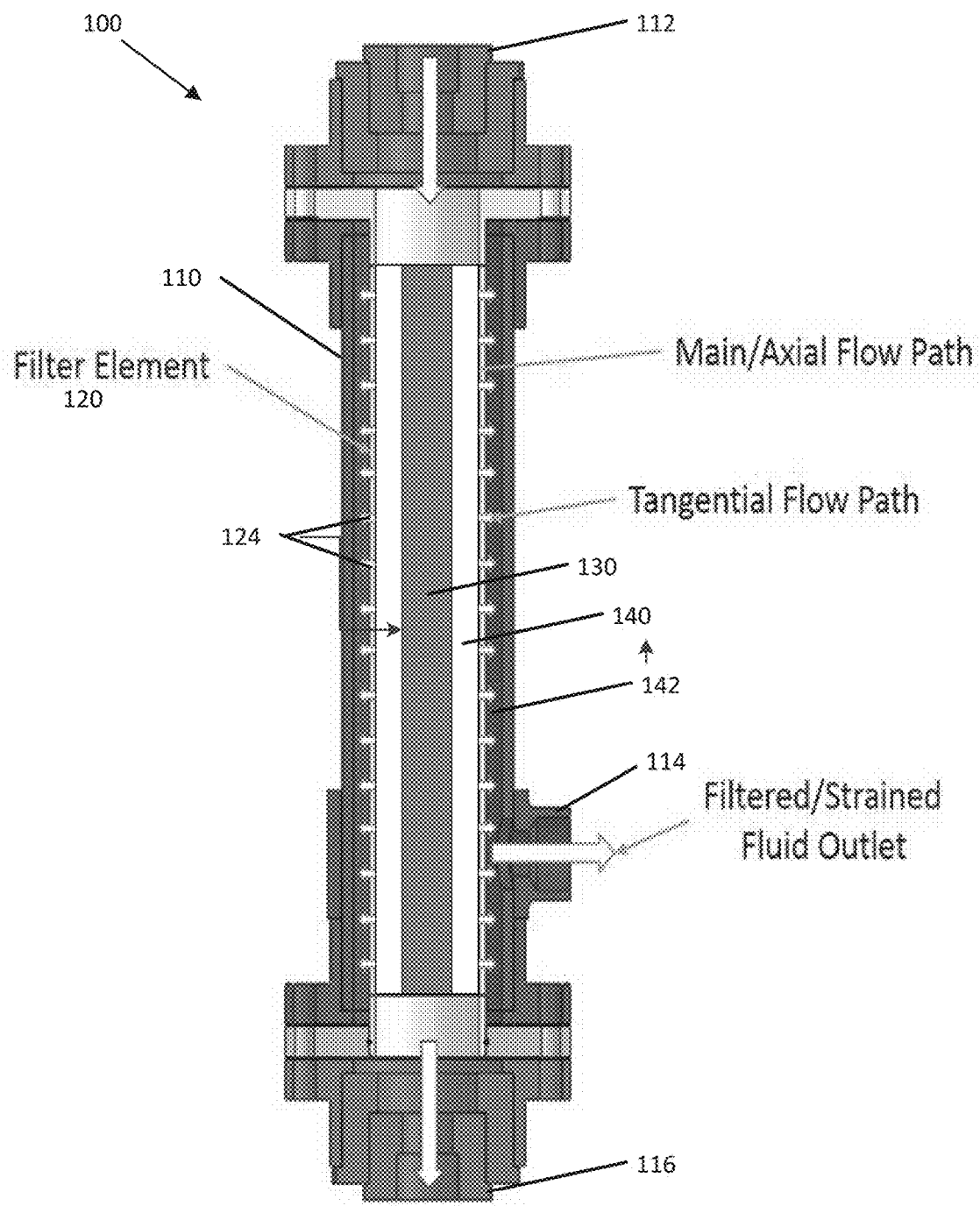
FIG. 1 depicts a side, cross-sectional view of a strainer, in accordance with the embodiments.

FIG. 1 depicts a side, cross-sectional view of a strainer 100, according to an embodiment. The strainer 100 may include a housing 110 defining an internal volume. The housing 110 may include one or more inlets (one is shown: 112) that provide a path of fluid communication from an exterior the housing 110 to the internal volume, and one or more outlets (two are shown: 114, 116) that provide a path of fluid communication from the internal volume to the exterior of the housing 110.

A filter element 120 may be positioned in the internal volume of the housing 110. As shown, the filter element 120 may be a hollow, cylindrical basket having an axial bore formed therethrough. However, the filter element 120 may have other shapes in other embodiments. The filter element 120 may be positioned at least partially between the inlet 112 and the outlets 114, 116. The filter element 120 may have a plurality of openings 124 formed (e.g., radially) therethrough. Thus, the openings 124 may be substantially transverse to the axial bore. The size of the openings 124 (e.g., the cross-sectional length or diameter) may be about 25% smaller than the desired filtrate particle size.

In at least one embodiment, an insert 130 may be positioned within the internal volume. The insert may be a solid plug. The size of the insert 130 may be dependent on the available main flow through the body 110. The higher the available main flow, the smaller the diameter of the insert 130 may be, and vice versa. As a result, for a given main flow or an available volumetric flowrate, the size of the insert 130 may affect the superficial velocity in the main line. This velocity in the main line keeps the strainer 100 clean. Placing the insert 130 inside the internal volume reduces the cross-sectional flowpath area through which fluid may flow, causing the velocity at which the fluid flows through the internal volume to increase.

The insert 130 may be positioned radially-inward from the filter element 120. As such, a first or "inner" annulus 140 may be formed between the insert 130 and the filter element 120. A second or "outer" annulus 142 may be formed between the filter element 120 and the housing 110. The fluid may flow radially-outward from the inner annulus 140, through the filter element 120, and into the outer annulus 142.

Figure 2:
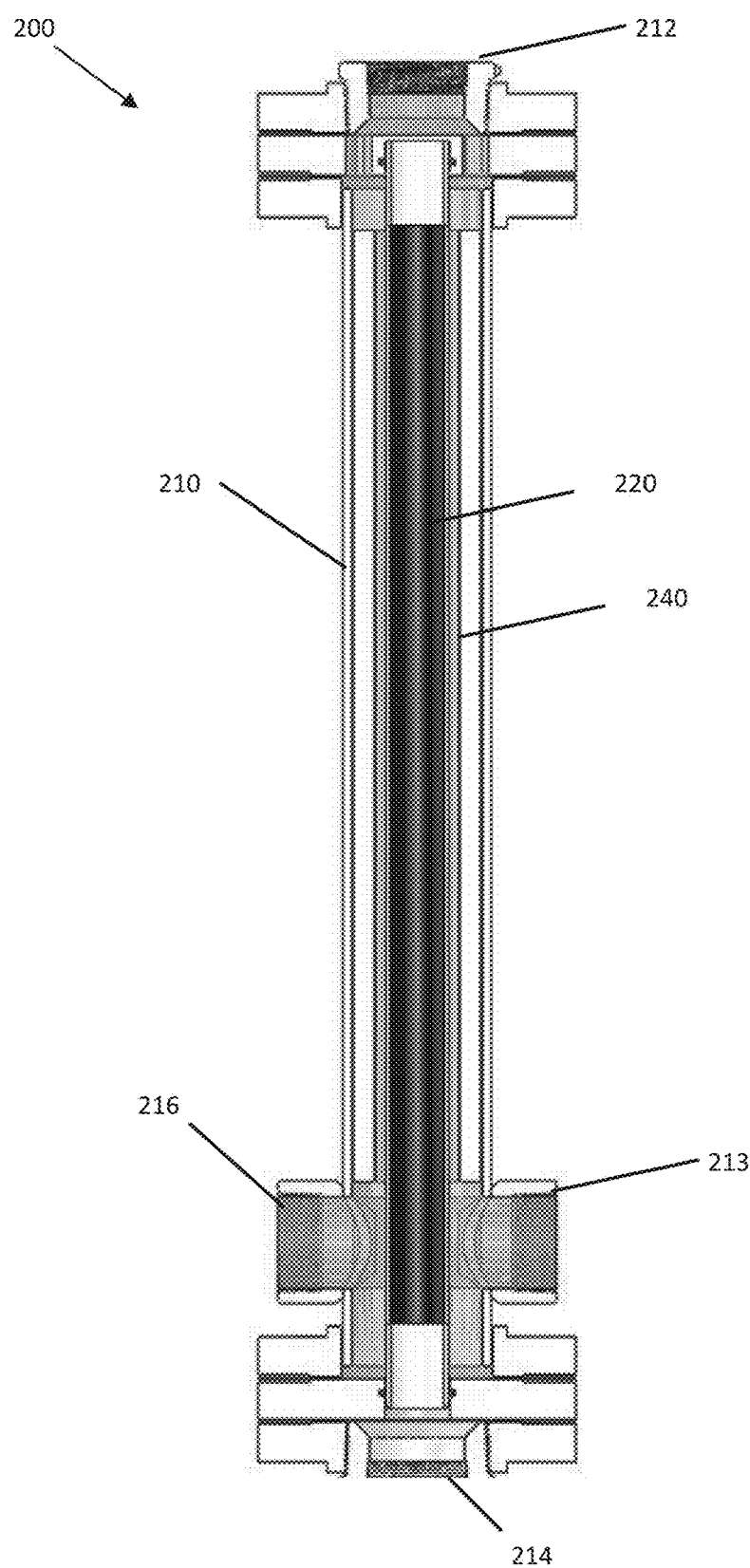
FIG. 2 depicts a side, cross-sectional view of a strainer, in accordance with the embodiments.

FIG. 2 depicts a side, cross-sectional view of another strainer 200, according to an embodiment. The strainer 200 may include a housing 210 defining an internal volume. The housing 210 may include one or more inlets (two are shown: 212, 213) that provide a path of fluid communication from an exterior the housing 210 to the internal volume, and one or more outlets (two are shown: 214, 216) that provide a path of fluid communication from the internal volume to the exterior of the housing 210.

A filter element 220 may be positioned in the internal volume of the housing 210. As shown, the filter element 220 may be a hollow, cylindrical basket having an axial bore formed therethrough. However, the filter element 220 may have other shapes in other embodiments. The filter element 220 may be positioned at least partially between the inlet 212 and the outlets 214, 216. The filter element 220 may have a plurality of openings formed (e.g., radially) therethrough. Thus, the openings may be substantially transverse to the axial bore. The size of the openings (e.g., the cross-sectional length or diameter) may be about 25% smaller than the desired filtrate particle size.

After the fluid flows into the strainer 200 through the first inlet 212, the fluid may be in an annulus 240 formed between the housing 210 and the filter element 220. A first portion of the fluid may flow radially-inward through the filter element 220 and into the axial bore in the filter element 220. The first portion of the fluid may then exit the housing 210 through the first outlet 214. A second portion of the fluid may bypass the filter element 210 and flow through the annulus 240 to the second outlet 216, where the second portion of the fluid may exit the housing 210. Additional fluid may also be introduced into the housing 210 through the second inlet 213 to flush particles that have accumulated in the housing 210 out of the housing 210.

Figure 3:
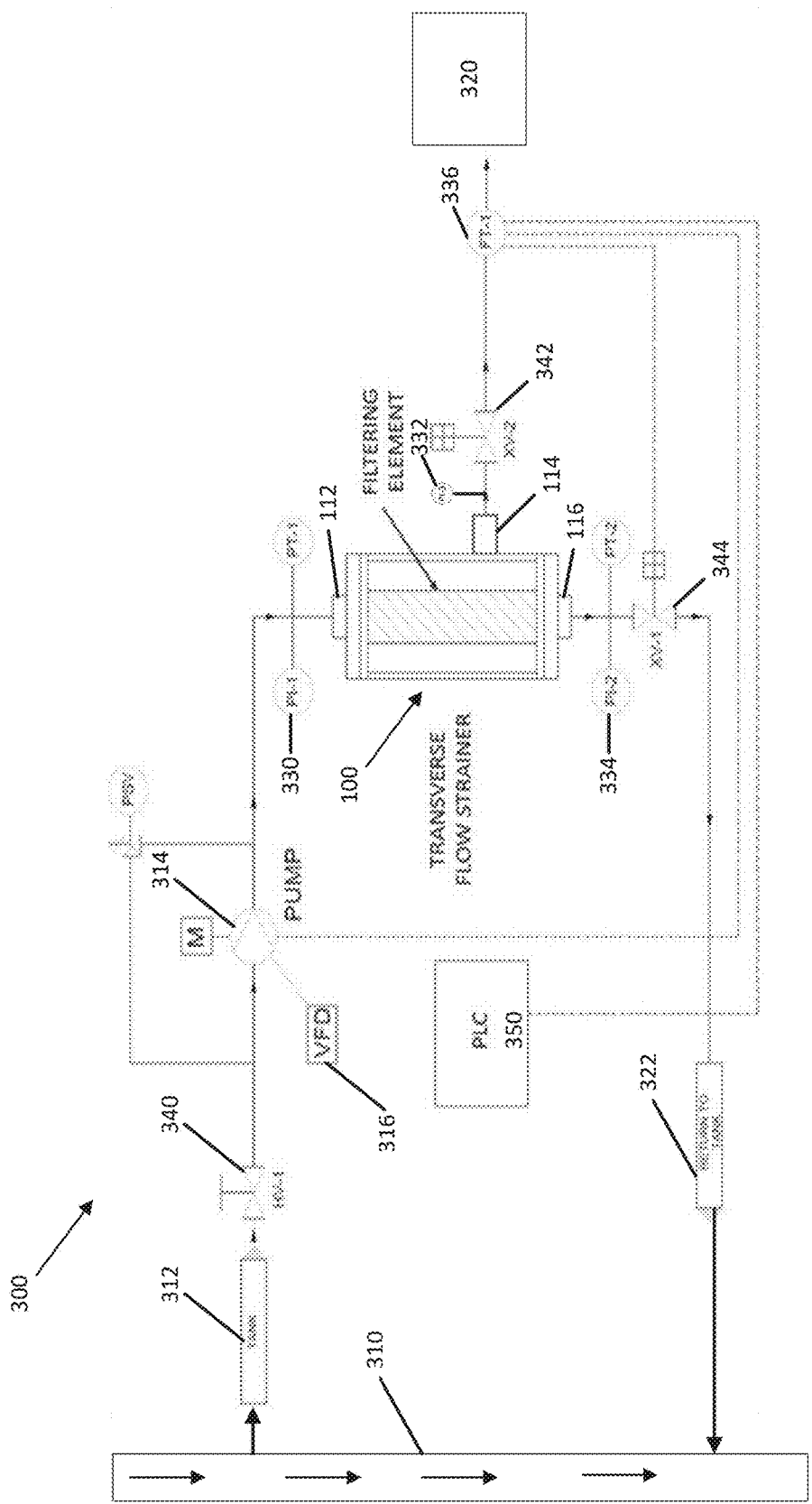
FIG. 3 depicts a schematic view of a system for filtering solid particles from a fluid stream, in accordance with the embodiments.

FIG. 3 depicts a schematic view of a system 300 for filtering solid particles from a fluid, according to an embodiment. The system 300 is shown including the strainer 100; however, in other embodiments, the system 300 may include the strainer 200. The system 300 may include a main line 310 having a fluid flowing therethrough. The fluid may be flowing through the main line 310 at a rate of, for example, about 500 gallons per minute ("GPM"). As will be appreciated, the flow rates provided herein are for illustrative purposes and are not intended to be limiting. In the example embodiment of FIG. 3, the fluid may be a cuttings reinjection ("CRI") fluid that is to be pumped into a subsurface formation for disposal; however, in other embodiments, the fluid may be or include slurries, or abrasives.

A portion of the fluid may be separated from the main line 310. The portion of the fluid may be from about 1% to about 20%, about 2% to about 10%, or less than about 5% of the fluid flowing through the main line 310. For example, the portion of the fluid may have a flow rate of about 25 GPM. As shown, the portion of the fluid may be at least temporarily stored in a tank 312; however, in other embodiments, the tank 312 may be omitted.

A pump 314 may be positioned downstream from the tank 312 and upstream from the inlet 112 of the strainer 100. The pump 314 may cause the fluid to flow from the tank 312 to the strainer 100. In one embodiment, a variable frequency drive ("VFD") 316 may control the shaft speed of the pump 314 and, thus, the volumetric flow rate of the fluid flowing out of the pump 314.

Once the fluid enters the strainer 100 through the inlet 112 (e.g., at 25 GPM), the fluid may flow through the inner annulus 140 (e.g., between the insert 130 and the filter element 120; see FIG. 1). A first portion of the fluid may flow (e.g., radially) through the openings 124 in the filter element 120 into the outer annulus 142. The first portion of the fluid may be from about 1% to about 20%, about 1% to about 10%, or less than about 5% of the fluid that enters the strainer 100 through the inlet 112. For example, the first portion of the fluid may have a flow rate of about 1 GPM.

The filter element 120 may prevent particles having a maximum cross-sectional length that is greater than or equal to the cross-sectional length of the openings 124 from passing through the filter element 120 into the outer annulus 142. The first portion of the fluid may then exit the strainer 100 through the first outlet 114.

In at least one embodiment, the first portion of the fluid may be introduced into a measurement device 320. The measurement device 320 may be a viscometer or any other measuring device with narrow channels that may be plugged by the solid laden fluid. When the measurement device 320 is a viscometer, the measuring device 320 may measure the viscosity of the first portion of the fluid. If the viscosity of the first portion of the fluid is greater than a predetermined maximum threshold, then a less viscous fluid (e.g., water) may be introduced into the main line 310 to dilute the fluid in the main line 310. If the viscosity of the first portion of the fluid is less than a predetermined minimum threshold, then additional cuttings may be added into the fluid in the main line 310.

Referring back to the strainer 100, a second portion of the fluid entering the strainer 100 through the inlet 112 may flow through the bore of the filter element 120 and bypass the openings 124. More particularly, the second portion of the fluid may flow through the inner annulus 140 (e.g., between the insert 130 and the filter element 120; see FIG. 1). The second portion of the fluid may exit the housing 110 through the second outlet 116. The second portion of the fluid may be from about 80% to about 99%, about 90% to about 99%, or greater than about 95% of the fluid that enters the strainer 100 through the inlet 112. For example, the second portion of the fluid may be about 24 GPM.

The flow of the second portion of the fluid from the inlet 112 to the second outlet 116 may reduce or prevent the buildup of particles (i.e., "filtrate") on the inner surface of the filter element 120. More particularly, the flow of the second portion of the fluid may exert a force on the particles in the internal volume of the strainer 100 that may prevent the particles from adhering to the inner surface of the filter element 120 and/or dislodge particles that are adhered to the inner surface of the filter element 120 without using any moving (e.g., mechanical) parts. When the insert 130 is placed in the internal volume, the velocity of the second portion of the fluid between the inlet 112 and the second outlet 116 increases, causing the force on the particles to increase as well. Thus, the addition of the insert 130 may further reduce or prevent the buildup of filtrate on the inner surface of the filter element 120. In at least one embodiment, once the second portion of the fluid exits the strainer 100, the second portion of the fluid may be introduced into another tank 322 and/or back into the main line 310.

The system 300 may also include one or more sensors (four are shown: 330, 332, 334, 336). The first sensor 330 may be positioned downstream from the pump 314 and upstream from the strainer 100. For example, the first sensor 330 may be positioned proximate to the inlet 112 of the strainer 100. The first sensor 330 may be configured to measure the pressure of the fluid flowing into the strainer 100. The second sensor 332 may be positioned downstream from the strainer 100. For example, the second sensor 332 may be positioned proximate to the first outlet 114 of the strainer 100. The second sensor 330 may be configured to measure the pressure of the first portion of the fluid exiting the strainer 100 through the first outlet 114. The third sensor 334 may also be positioned downstream from the strainer 100. For example, the third sensor 334 may be positioned proximate to the second outlet 116 of the strainer 100. The third sensor 334 may be configured to measure the pressure of the second portion of the fluid exiting the strainer 100 through the second outlet 116. The fourth sensor 336 may also be positioned downstream from the strainer 100. For example, the fourth sensor 336 may be positioned proximate to the first outlet 114 of the strainer 100. The fourth sensor 336 may be configured to measure the volumetric flow rate of the first portion of the fluid exiting the strainer 100 through the first outlet 114.

The system 300 may also include one or more valves (three are shown: 340, 342, 344). The first valve 340 may be positioned downstream from of the tank 312 and/or upstream from the pump 314 and the strainer 100. The second valve 342 may be positioned downstream from the first outlet 114 of the strainer 100. The third valve 344 may be positioned downstream from the second outlet 116 of the strainer 100. The valves 340, 342, 344 may each be actuated between a closed position and an open position. When the valves 340, 342, 344 are in the closed position, no fluid may flow therethrough. When the valves 340, 342, 344 are in the open position, fluid may flow therethrough. In at least one embodiment, the valves 340, 342, 344 may also include one or more intermediate position(s) that allow(s) fluid to flow therethrough, but at a lesser volumetric flow rate then when the valves 340, 342, 344 are in the open position.

A computer system (e.g., a programmable logic controller) 350 may be in communication with the first sensor 330, the second sensor 332, the third sensor 334, the fourth sensor 336, the first valve 340, the second valve 342, the third valve 344, or a combination thereof. The computer system 350 may include a processor and a memory system. The memory system may include one or more non-transitory computer-readable media storing instructions that, when executed by the processor, cause the processor to perform operations. The computer system 350 may be configured to notify a user and/or actuate one or more of the valves 340, 342, 344 when one or more of the measurements taken by one or more of the sensors 330, 332, 334, 336 exceeds a predetermined maximum threshold or falls below a predetermined minimum threshold.

Figure 4:
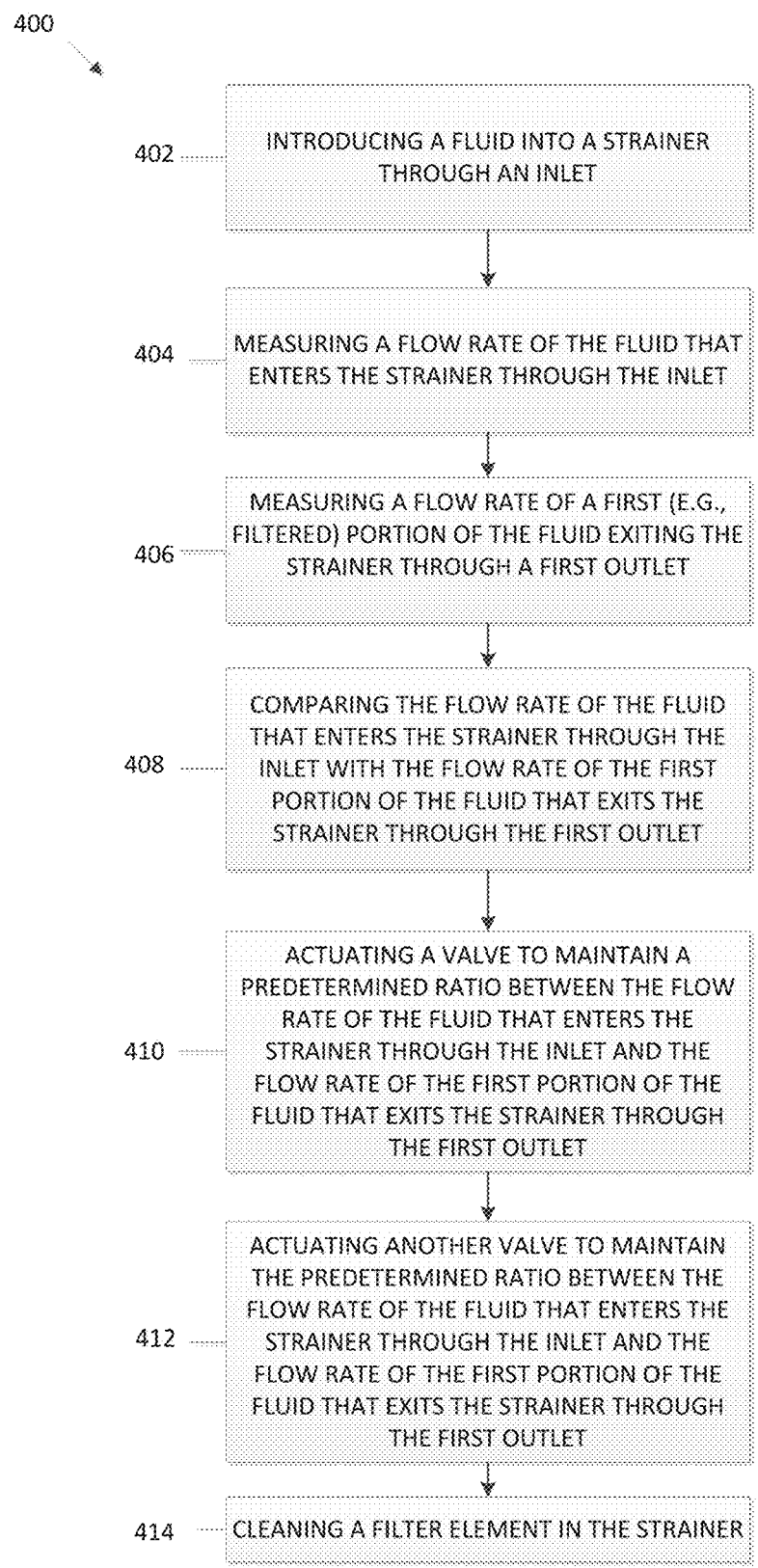
FIG. 4 depicts a flow chart of a method for filtering solid particles from a fluid, in accordance with the embodiments.

FIG. 4 depicts a flow chart of a method 400 for filtering solid particles from a fluid, according to an embodiment. The method 400 may be performed using the system 300 shown in FIG. 3; however, the method 400 may be performed using other systems as well. The method 400 may begin by introducing a fluid into the strainer 100 through the inlet 112 of the strainer 100, as at 402. As discussed above, the fluid may have a plurality of particles dispersed therein. The method 400 may then include measuring a flow rate of the fluid that enters the strainer 100 through the inlet 112, as at 404.

A first portion of the fluid may flow (e.g., radially) through openings 124 in the filter element 120 in the strainer 100, which may remove at least a portion of the particles from the first portion of the fluid. The first portion of the fluid may then exit the strainer 100 through a first outlet 114. A second portion of the fluid may flow (e.g., axially) through the filter element 120, bypassing the openings 124, and exit the strainer 100 through a second outlet 116.

The method 400 may also include measuring a flow rate of the first (e.g., filtered) portion of the fluid that exits the strainer 100 through the first outlet 114 with a sensor (e.g., the fourth sensor 336), as at 406. The method 400 may also include comparing the flow rate of the fluid that enters the strainer 100 through the inlet 112 with the flow rate of the first portion of the fluid that exits the strainer 100 through the first outlet 114, as at 408. The comparison may be performed using the computer system 350.

The method 400 may also include actuating a valve (e.g., valve 342) to maintain a predetermined ratio between the flow rate of the fluid that enters the strainer 100 through the inlet 112 and the flow rate of the first portion of the fluid that exits the strainer 100 through the first outlet 114, as at 410. The valve 342 may be actuated in response to a signal from the computer system 350. Actuating the valve 342 may include throttling the valve 342 to reduce the cross-sectional area through which the first portion of the fluid may flow therethrough. The valve 342 may be throttled more and more over time as the filter element 120 becomes more and more clogged with particles. The predetermined ratio may include the flow rate of the first portion of the fluid that exits the strainer 100 through the first outlet 114 being from about 1% to about 25% or about 5% to about 15% of the flow rate of the fluid that enters the strainer 100 through the inlet 112.

Once throttling the valve 342 is no longer able to maintain the predetermined ratio between the flow rates, the method 400 may include actuating another valve (e.g., valve 344) to maintain the predetermined ratio between the flow rate of the fluid that enters the strainer 100 through the inlet 112 and the flow rate of the first portion of the fluid that exits the strainer 100 through the first outlet 114, as at 412. The valve 344 may be actuated in response to a signal from the computer system 350. Actuating the valve 344 may include throttling the valve 344 to reduce the cross-sectional area through which the second portion of the fluid may flow therethrough. The valve 344 may be throttled more and more over time as the filter element 120 becomes more and more clogged with particles. Throttling the valve 344 may increase the pressure of the second portion of the fluid, thereby causing the flow rate of the first portion of the fluid (that flows through the filter element 120) to increase.

Once throttling the valve 344 is no longer able to maintain the predetermined ratio between the flow rates, the filter element 120 may be cleaned, as at 414. Cleaning the filter element 120 may include stopping the pump 314, and cleaning the filter element 120 manually. In another embodiment, a plunger may move manually within the internal volume to scrape at least a portion of the particles off of the inner surface of the filter element 120. In yet another embodiment, the flow through the filter element 120 may be temporarily reversed to cause at least a portion of the particles to dislodge from the inner surface of the filter element 120. In yet another embodiment, cleaning the filter element 120 may include actuating the second valve 342 into the closed position and actuating the third valve 344 into the open position. This may "flush" the filtrate off of the filter element 120 and out of the second outlet 116 of the strainer 100. Once the filtrate has been flushed out of the strainer 100, the computer system 350 may actuate the second valve 342 into the open position. The third valve 344 may remain in the open position or be actuated into the closed position.

In another embodiment, rather than measuring and comparing the flow rates, the method 400 may include measuring and comparing a pressure of the first (e.g., filtered) portion of the fluid that exits the strainer 100 through the first outlet 114 with a sensor (e.g., the second sensor 332) and a pressure of the second (e.g., non-filtered) portion of the fluid that exits the strainer 100 through the second outlet 116 with another sensor (e.g., the third sensor 334). The valves 342, 344 may be actuated, as described above, to maintain a predetermined ratio between the pressures. The predetermined ratio may include the pressure of the first portion of the fluid that exits the strainer 100 through the first outlet 114 being from about 80% to about 120% or about 90% to about 110% of the pressure of the fluid that enters the strainer 100 through the inlet 112. In another embodiment, rather than a predetermined ratio, the pressure of the first portion of the fluid that exits the strainer 100 through the first outlet 114 may be maintained to be 15 PSI below the pressure of the second portion of the fluid that exits the strainer 100 through the second outlet 116.

When introducing elements of various embodiments of the present disclosure, the articles "a," "an," and "the" are intended to mean that there are one or more of the elements. As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A system for filtering particles from a fluid, comprising: a strainer comprising:
   a housing having an inlet, a first outlet, a second outlet; and
   a filter element positioned in an internal volume of the housing, wherein the filter element defines a bore formed axially-therethrough and a plurality of openings that are substantially transverse to the bore, wherein a first portion of the fluid that enters the housing through the inlet flows through the openings in the filter element into an outer annulus and exits the housing through the first outlet, and wherein a second portion of the fluid that enters the housing through the inlet bypasses the openings and exits the housing through the second outlet,
   wherein the inlet of the housing is in direct fluid communication with the bore formed axially-therethrough the filter element and the outer annulus is provided between the housing and the filter element.

2. The system of claim 1, further comprising a sensor coupled to the first outlet and configured to measure a flow rate of the first portion of the fluid that exits the housing through the first outlet.

3. The system of claim 2, further comprising a first valve coupled to the first outlet, the sensor, or both, wherein the first valve is configured to be actuated to maintain the flow rate of the first portion of the fluid within a predetermined range.

4. The system of claim 3, further comprising a second valve coupled to the second outlet, wherein the second valve is configured to be actuated to maintain the flow rate of the first portion of the fluid within the predetermined range.

5. The system of claim 1, further comprising:
   a first sensor coupled to the inlet and configured to measure a pressure of the fluid that enters the housing through the inlet; and
   a second sensor coupled to the first outlet and configured to measure a pressure of the first portion of the fluid that exits the housing through the first outlet.

6. The system of claim 1, wherein the first portion of fluid comprises from about 1% to about 10% of the fluid that enters the housing through the inlet, and wherein the second portion of the fluid comprises from about 90% to about 99% of the fluid that enters the housing through the inlet.

7. The system of claim 1, further comprising an insert positioned within the internal volume of the housing and at least partially within the filter element, wherein the insert occupies a portion of the internal volume that is inside the filter element.

8. The system of claim 1, further comprising a viscometer coupled to the first outlet of the housing, wherein the viscometer is configured to measure a viscosity of the first portion of the fluid that exits the housing through the first outlet.

9. The system of claim 1, wherein the housing comprises a second inlet, wherein an additional fluid flows through the second inlet to flush the particles out of the housing.

10. The system of claim 1, wherein the fluid comprises a cuttings reinjection fluid.

11. A system for filtering particles from a fluid, comprising: a main line having the fluid flowing therethrough;
    a pump coupled to the main line, wherein the pump is configured to cause a portion of the fluid from the main line to flow therethrough, and wherein the portion comprises from about 1% to about 10% of the fluid in the main line;

a strainer coupled to the pump, wherein the strainer comprises:
　　a housing having an inlet, a first outlet, a second outlet; and
　　a filter element positioned in an internal volume of the housing, wherein the filter element defines a bore formed axially-therethrough and a plurality of openings that are substantially transverse to the bore, wherein a first portion of the fluid that enters the housing through the inlet flows through the openings in the filter element into an outer annulus and exits the housing through the first outlet, and wherein a second portion of the fluid that the housing through the inlet flows through the bore and exits the housing through the second outlet, wherein the inlet of the housing is in direct fluid communication with the bore formed axially-therethrough the filter element and the outer annulus is provided between the housing and the filter element;
　　a sensor coupled to the first outlet and configured to measure a flow rate of the first portion of the fluid that exits the housing through the first outlet; and
　　a valve coupled to the first outlet and configured to be actuated to maintain the flow rate of the first portion of the fluid within a predetermined range.

12. The system of claim 11, wherein the first portion of the fluid comprises from about 1% to about 10% of the fluid that flows through the pump and into the housing through the inlet.

13. The system of claim 11, further comprising a second valve coupled to the second outlet, wherein the second valve is configured to be actuated to maintain the flow rate of the first portion of the fluid within the predetermined range.

14. The system of claim 11, further comprising a viscometer coupled to the first outlet and configured to measure a viscosity of the first portion of the fluid that exits the housing through the first outlet.

15. The system of claim 11, wherein the second outlet is coupled to the main line and configured to return the second portion of the fluid to the main line.

16. A method for filtering particles from a fluid, comprising:
　　introducing a fluid into a strainer through an inlet of the strainer, wherein the strainer comprises:
　　　　a housing having the inlet, a first outlet, a second outlet; and
　　　　a filter element positioned in an internal volume of the housing, wherein the filter element defines a bore formed axially-therethrough and a plurality of openings that are substantially transverse to the bore, wherein a first portion of the fluid that enters the housing through the inlet flows through the openings in the filter element and exits the housing through the first outlet, and wherein a second portion of the fluid that the housing through the inlet flows through the bore and exits the housing through the second outlet, wherein the first portion of fluid comprises from about 1% to about 10% of the fluid that enters the housing through the inlet, and wherein the second portion of the fluid comprises from about 90% to about 99% of the fluid that enters the housing through the inlet;
　　measuring a flow rate of the fluid entering the housing through the inlet with a first sensor that is coupled to the inlet;
　　measuring a flow rate of the first portion of the fluid that exits the housing through the first outlet with a second sensor that is coupled to the first outlet;
　　comparing the flow rate of the fluid entering the housing through the inlet and the flow rate of the first portion of the fluid that exits the housing through the first outlet; and
　　actuating a first valve coupled to the first outlet when the flow rate of the first portion of the fluid that exits the housing through the first outlet differs from the flow rate of the fluid that enters the housing through the inlet by more than a predetermined amount.

17. The method of claim 16, wherein actuating the first valve comprises throttling the first valve.

18. The method of claim 16, further comprising actuating a second valve coupled to the second outlet when the flow rate of the first portion of the fluid that exits the housing through the first outlet differs from the flow rate of the fluid that enters the housing through the inlet by more than the predetermined amount.

19. The method of claim 18, further comprising cleaning the filter element after the first and second valves have been actuated.

20. The method of claim 16, further comprising measuring a viscosity of the first portion of the fluid with a viscometer that coupled to the first outlet.

* * * * *